United States Patent
Lee et al.

(10) Patent No.: US 10,688,720 B2
(45) Date of Patent: Jun. 23, 2020

(54) THREE-DIMENSIONAL PRINTING APPARATUS

(71) Applicants: XYZprinting, Inc., New Taipei (TW); Kinpo Electronics, Inc., New Taipei (TW)

(72) Inventors: Yang-Teh Lee, New Taipei (TW); Chien-Chih Chen, New Taipei (TW); Shih-Wei Huang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 459 days.

(21) Appl. No.: 15/660,978

(22) Filed: Jul. 27, 2017

(65) Prior Publication Data

US 2018/0319080 A1 Nov. 8, 2018

(30) Foreign Application Priority Data

May 4, 2017 (CN) .......................... 2017 1 0307376

(51) Int. Cl.
*B29C 64/227* (2017.01)
*B33Y 30/00* (2015.01)
(Continued)

(52) U.S. Cl.
CPC .......... *B29C 64/227* (2017.08); *B29C 64/106* (2017.08); *B29C 64/343* (2017.08);
(Continued)

(58) Field of Classification Search
CPC ..... B29C 64/227; B29C 64/20; B29C 64/209; B29C 64/232; B29C 64/236;
(Continued)

(56) References Cited

U.S. PATENT DOCUMENTS

2015/0140158 A1* 5/2015 Cervantes .............. B33Y 30/00
425/461
2016/0067920 A1 3/2016 Fontaine
(Continued)

FOREIGN PATENT DOCUMENTS

WO 2015074061 5/2015

OTHER PUBLICATIONS

"Search Report of Europe Counterpart Application", dated May 30, 2018, p. 1-p. 7.

*Primary Examiner* — Joseph S Del Sole
*Assistant Examiner* — Lawrence D. Hohenbrink, Jr.
(74) *Attorney, Agent, or Firm* — JCIPRNET

(57) ABSTRACT

A 3-D printing apparatus includes a body, a disposed in the body, a control module, a print head module assembled to the body and electrically connected with the control module and a sensing module. The sensing module is assembled to the print head module to move along with the print head module in the body and electrically connected with the control module and includes a probe. The control module drives the print head module to move and causes a part of the body to hit the sensing module, thereby driving the probe to protrude from the print head module to form a first state. In the first state, the control module drives the print head module to move and causes the probe to contact the platform, thereby determining a surface state of the platform.

14 Claims, 13 Drawing Sheets

(51) Int. Cl.
*B29C 64/386* (2017.01)
*B29C 64/106* (2017.01)
*B33Y 50/00* (2015.01)
*B29C 64/343* (2017.01)
B29C 64/209 (2017.01)
B29C 64/20 (2017.01)
B29C 64/236 (2017.01)
B29C 64/393 (2017.01)
B29C 64/232 (2017.01)
B33Y 50/02 (2015.01)
B33Y 40/00 (2020.01)

(52) U.S. Cl.
CPC ............ *B29C 64/386* (2017.08); *B33Y 30/00* (2014.12); *B33Y 50/00* (2014.12); *B29C 64/20* (2017.08); *B29C 64/209* (2017.08); *B29C 64/232* (2017.08); *B29C 64/236* (2017.08); *B29C 64/393* (2017.08); *B33Y 40/00* (2014.12); *B33Y 50/02* (2014.12)

(58) Field of Classification Search
CPC ... B29C 64/386; B29C 64/393; B29C 64/106; B29C 64/343; B33Y 30/00; B33Y 50/00; B33Y 50/02; B33Y 40/00
See application file for complete search history.

(56) References Cited

U.S. PATENT DOCUMENTS

2016/0068793 A1    3/2016   Maggiore
2017/0144379 A1*   5/2017   Sung ..................... B33Y 50/02

\* cited by examiner

THREE-DIMENSIONAL PRINTING APPARATUS

CROSS-REFERENCE TO RELATED APPLICATION

This application claims the priority benefit of China application serial no. 201710307376.0, filed on May 4, 2017. The entirety of the above-mentioned patent application is hereby incorporated by reference herein and made a part of this specification.

BACKGROUND

Technical Field

The disclosure relates to a three-dimensional (3-D) printing apparatus.

Description of Related Art

With the advance in computer-aided manufacturing (CAM), the manufacturing industry has developed a three-dimensional (3-D) printing technology to rapidly convert original design concept into physical objects. The 3-D printing technology is actually a general designation of a series of rapid prototyping (RP) techniques. A basic principle thereof is an additive manufacturing by using a RP machine to form a sectional shape of a workpiece in an X-Y plane through scanning and to intermittently shift by a layer thickness along a Z-axis, so as to finally form a 3-D object. The 3-D printing technology is not limited to any geometric shape, and the more complex the components are, the more excellent the RP technology can demonstrate. The 3-D printing technology may greatly save manpower and processing time. With a demand of shortest time, a digital 3-D model designed by using a 3-D computer-aided design (CAD) software may be truthfully presented as touchable. In the meantime, not only the geometric shape of the 3-D object can be actually experienced, but also assemblability of the piece may be tested, or even possible function test may be performed.

In general, a currently available 3-D printing apparatus usually reads a digital 3-D model to build a 3-D object related to the digital 3-D model accordingly by using the aforesaid RP techniques. However, as time goes by, a base of the 3-D printing apparatus used for carrying the building material may gradually tilt in comparison with a horizontal plane, while a coordinate of the digital 3-D model does not change, such that a printing head still stacks the building material on the platform based on the original plane. As a result, the printed 3-D object does not meet actual expectations, and quality and yield of the printing of the 3-D printing apparatus may be adversely affected.

SUMMARY

The disclosure is directed to a three-dimensional (3-D) printing apparatus, wherein a sensing module is assembled to a print head module and moves along with the print head module, and in this way, a control module drives the print head module to move and causes a part of the body to hit the sensing module, thereby, driving a probe of the sensing module to protrude from the print head module. As such, a platform is successfully calibrated for testing a planarity thereof.

According to an embodiment of the disclosure, a 3-D printing apparatus including a body, a platform, a control module, a print head module and a sensing module is provided. The platform is disposed in the body. The print head module is assembled to the body and electrically connected with the control module. The print head module is controlled by the control module to move in the body and form a 3-D object on the platform. The sensing module is assembled to the print head module to move along with the print head module to move in the body. The sensing module is electrically connected with the control module, and the sensing module includes a probe. The control module drives the print head module to move and causes a part of the body to hit the sensing module, thereby driving the probe to protrude from the print head module to form a first state. In the first state, the control module drives the print head module to move and causes the probe to contact the platform, thereby determining a surface state of the platform.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
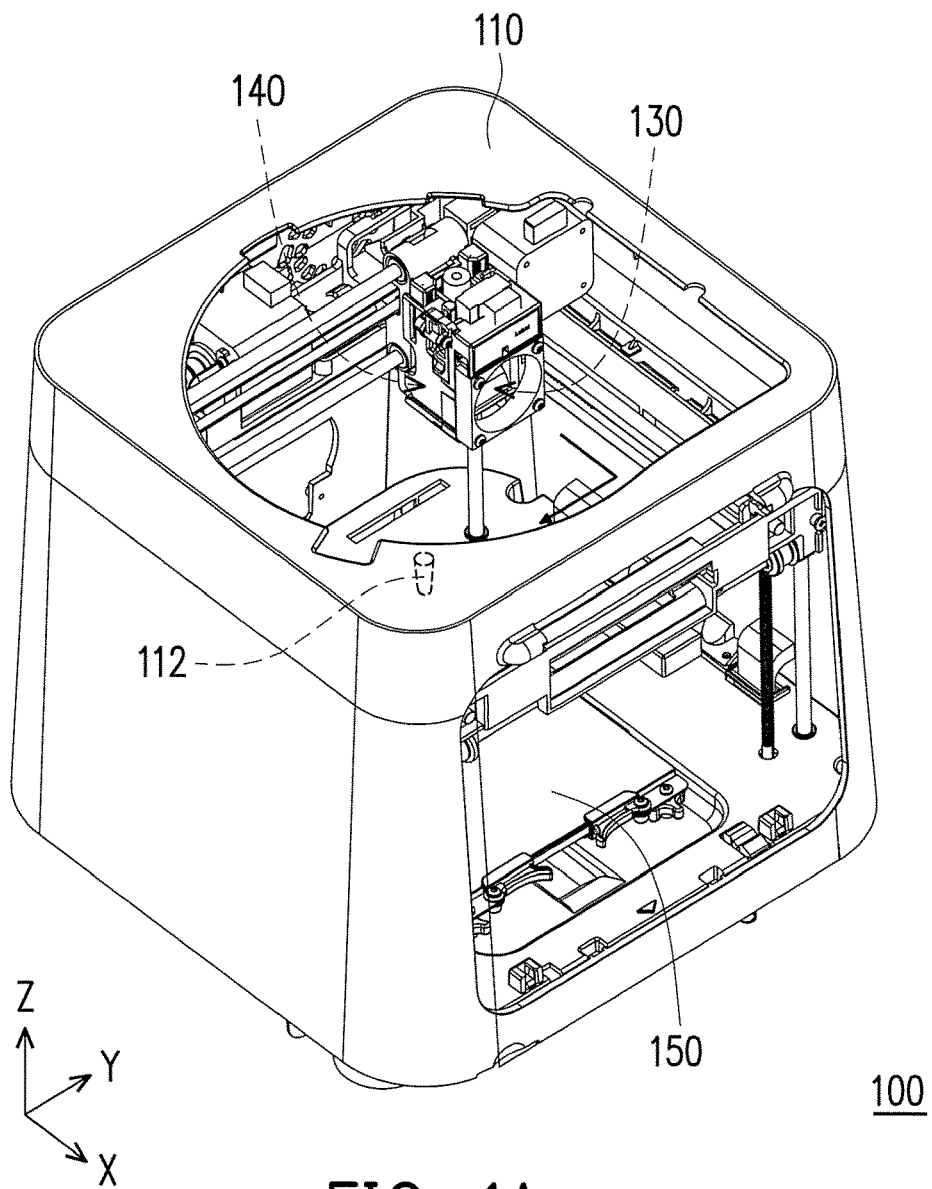
FIG. 1A is a schematic diagram illustrating a three-dimensional (3-D) printing apparatus according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 1B:
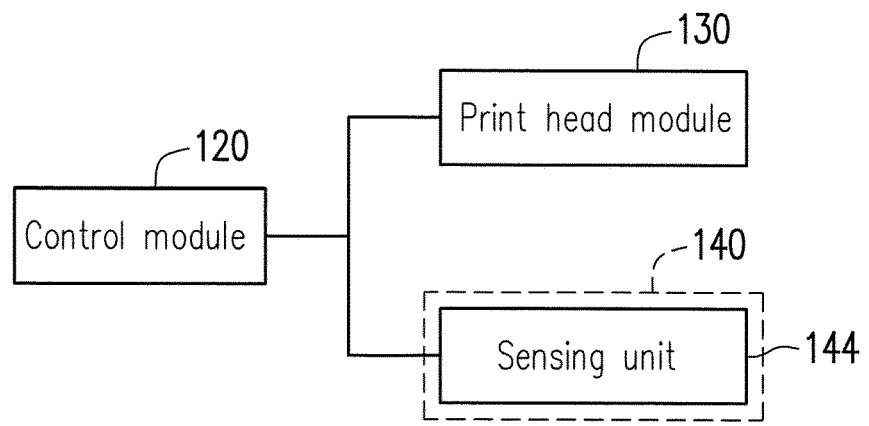
FIG. 1B illustrates electrical relation among a part of elements of the 3-D printing apparatus depicted in FIG. 1A.

FIG. 1A is a schematic diagram illustrating a three-dimensional (3-D) printing apparatus according to an embodiment of the disclosure. FIG. 1B illustrates electrical relation among a part of elements of the 3-D printing apparatus. In the meantime, a Cartesian coordinate system X-Y-Z is also provided for element description.

Referring to both FIG. 1A and FIG. 1B, in the present embodiment, a 3-D printing apparatus 100 includes a body 110, a control module 120, a print head module 130, a sensing module 140 and a platform 150. The platform 150 is disposed in the body 110. The print head module 130 is movably assembled to the body 110 and electrically connected with the control module 120, such that the print head module 130 is controlled by the control module 120 to move inside the body 110 to print and form a 3-D object on the platform 150. In this case, the 3-D printing apparatus 100 is, for example, a fused deposition modeling (FDM) printing apparatus, and detailed operation thereof will not be repeatedly described. As described above, the platform 150 used to carry a building material in the 3-D printing apparatus 100 is subject to gradually incline as time goes by. In order to maintain the quality whenever a 3-D printing operation is performed, the 3-D printing apparatus 100 of the present embodiment further includes a sensing module 140 having a probe (which will be described in detail below) and a sensing unit 144. The sensing unit 144 is electrically connected with the control module 120, such that before the 3-D printing operation is performed, the control module 120 may drive the probe to probe the platform 150 and show a current planarity or surficial outline of the platform 150 for providing reference to a processing module of the 3-D printing apparatus 100 or a user to correspondingly adjust the platform 150, thereby achieving a calibration effect.

Herein, providing reference to the processing module or the user indicates that the processing module or the user may correspondingly perform the calibration after obtaining the planarity of the platform 150, thereby returning the platform back or aligning the platform according to the required planarity. Certainly, in another state, after obtaining the planarity of the platform 150, the processing module or the user may continue to correspondingly perform compensation according to the measured information during the process of the 3-D printing operation. The corresponding operation which is taken after the planarity of the platform 150 is sensed is not limited herein.

Figure 2A:
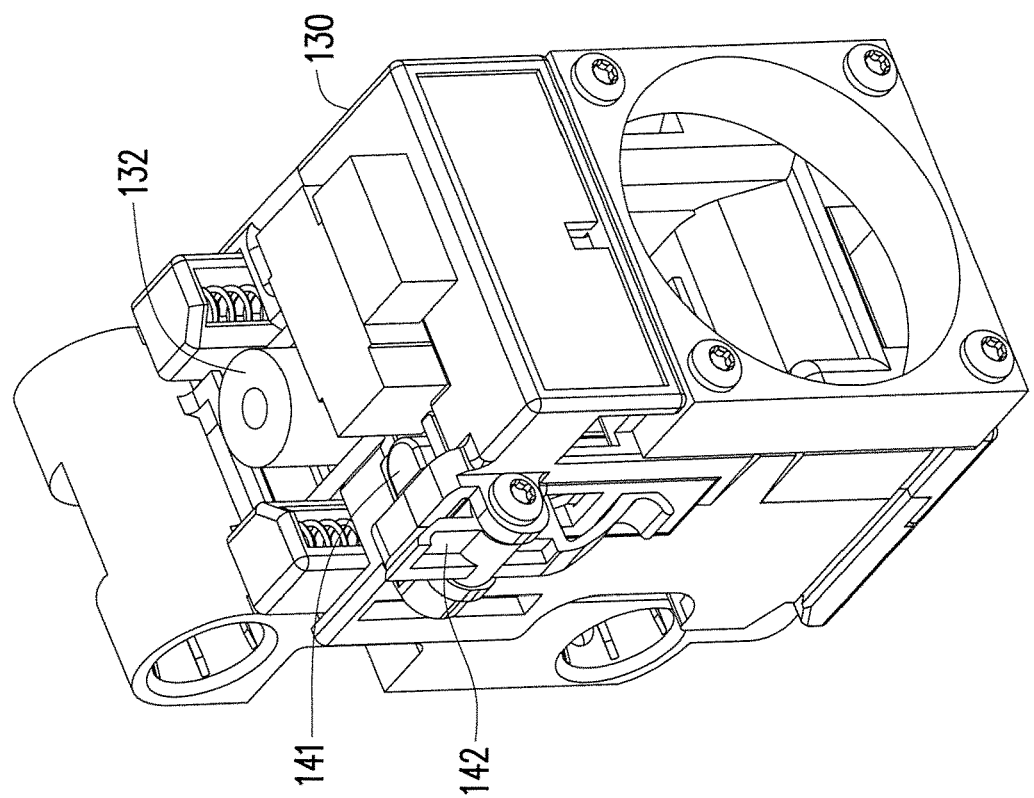
FIG. 2A is a schematic diagram illustrating changes in states of the print head module and the sensing module.
Figure 2A:
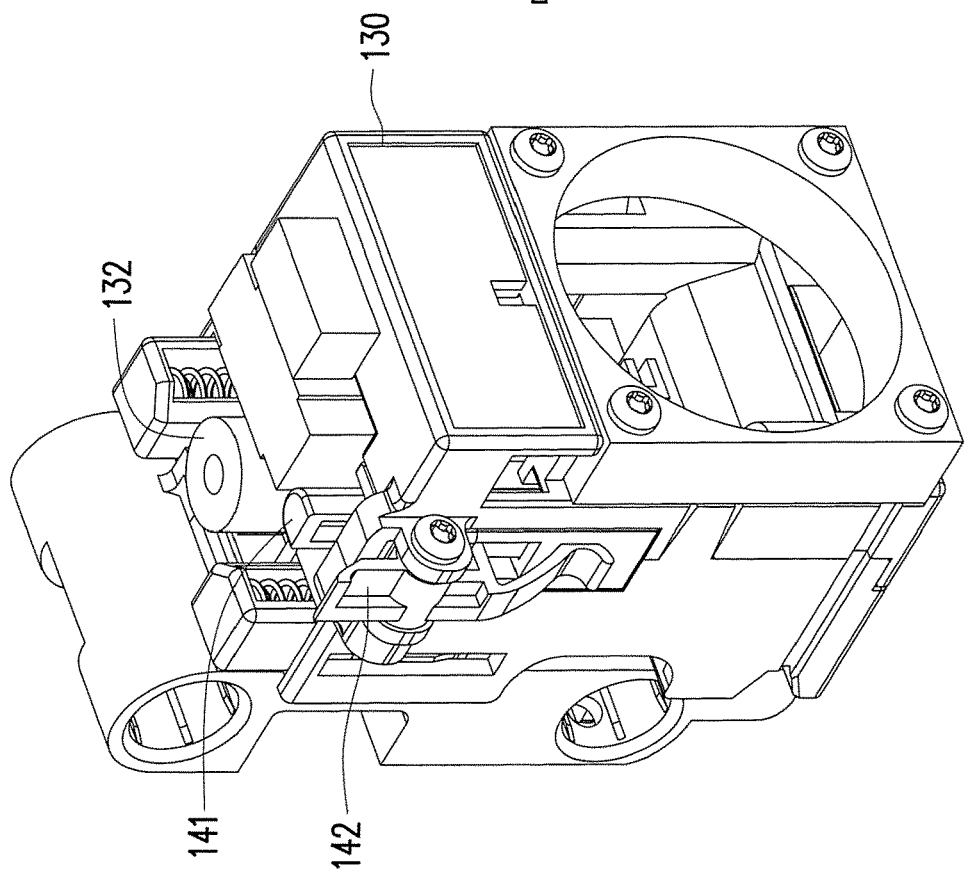
Figure 2B:
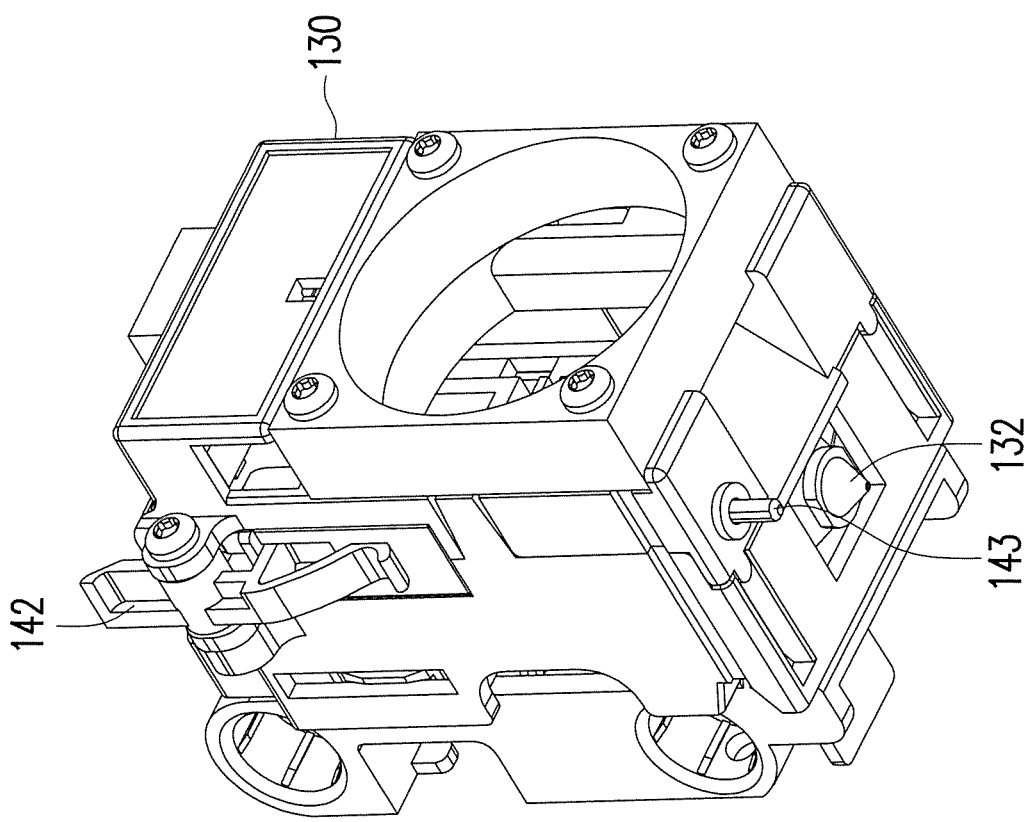
FIG. 2B is a schematic diagram illustrating changes in states of the print head module and the sensing module in another viewing angle.
Figure 2B:
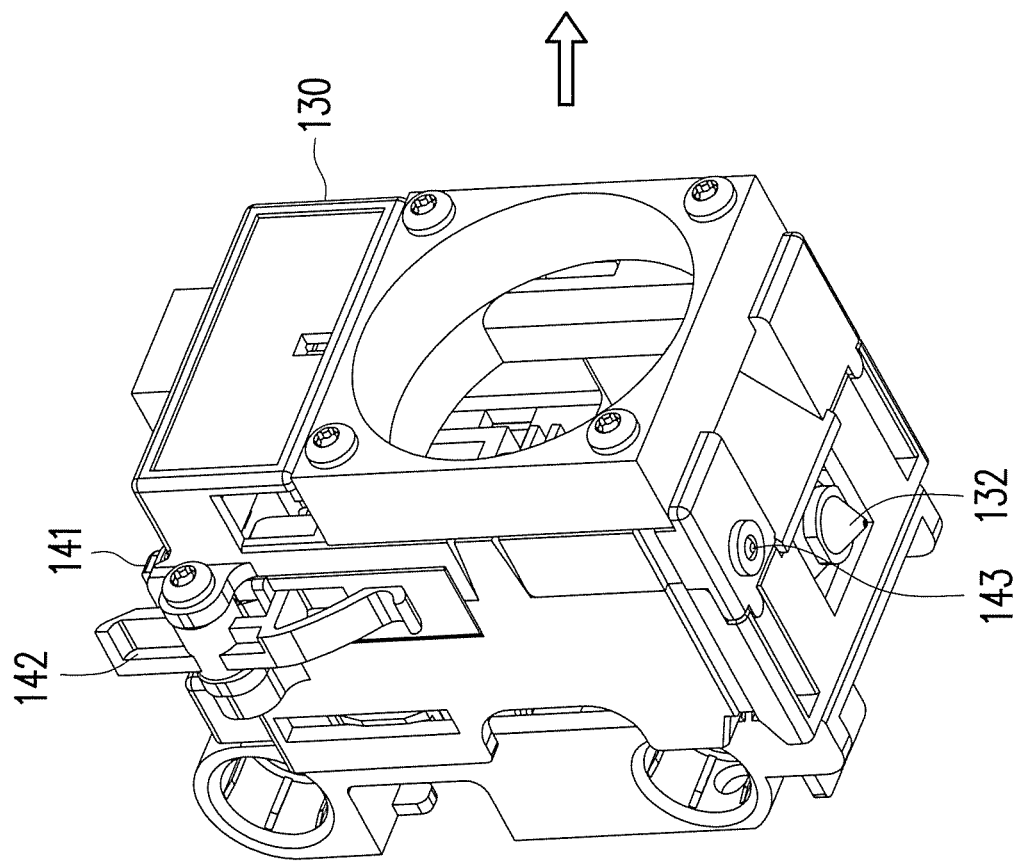
Figure 3:
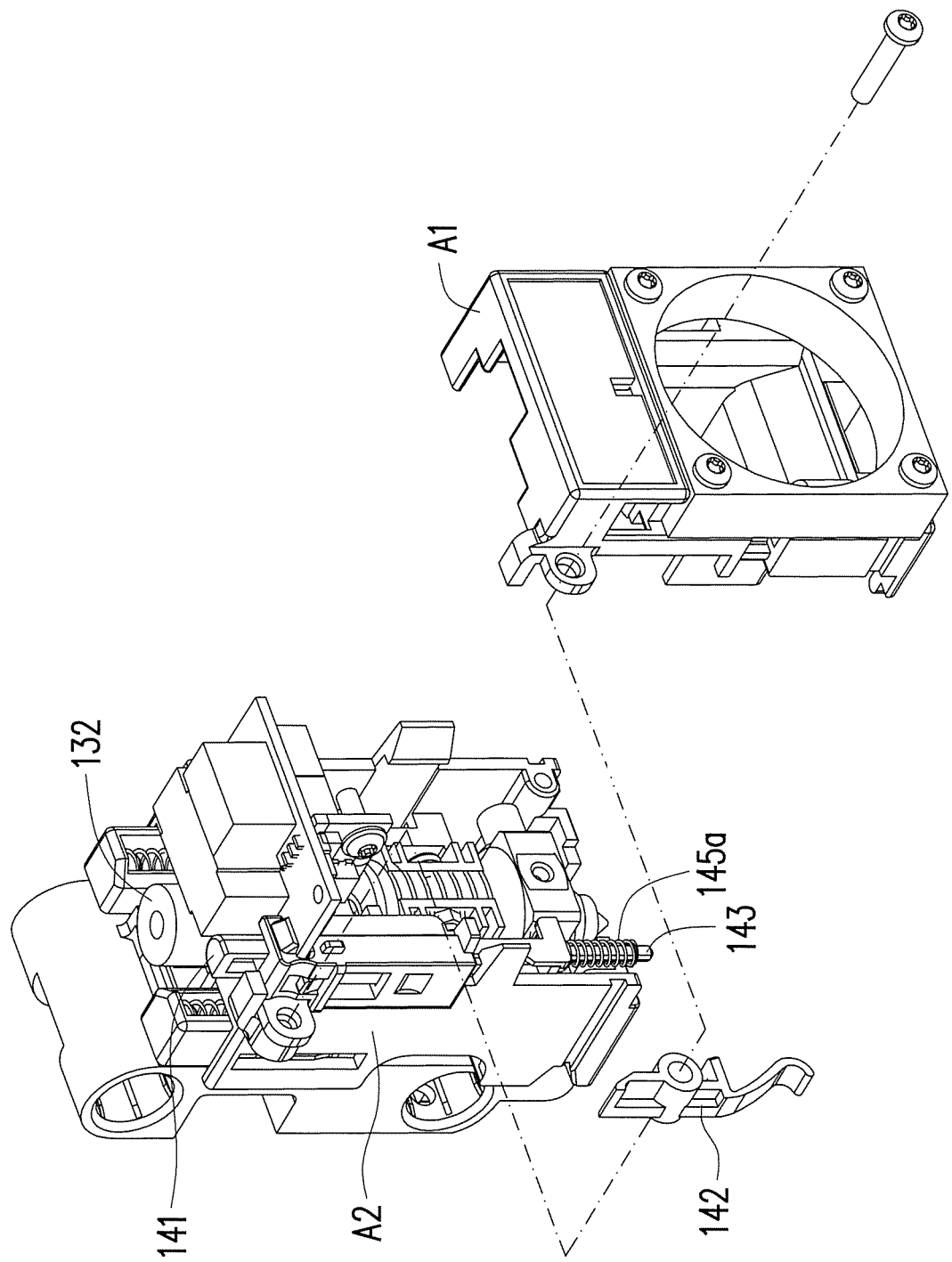
FIG. 3 is a schematic diagram illustrating the assembly of the print head module and the sensing module.

FIG. 2A is a schematic diagram illustrating changes in states of the print head module and the sensing module. FIG. 2B is a schematic diagram illustrating changes in states of the print head module and the sensing module in another viewing angle. FIG. 3 is a schematic diagram illustrating the assembly of the print head module and the sensing module. Referring to FIG. 2A, FIG. 2B and FIG. 3 simultaneously, in the present embodiment, the sensing module 140 is assembled to the print head module 130 to move along with the print head module 130 inside the body 110. Before the 3-D printing operation is performed, the control module 120 may drive the print head module 130 to move toward a part of the body 110 along a path shown by an arrow depicted in FIG. 1A. In this case, a tapered cylindrical pillar 112 is taken as an example, when the print head module 130 moves toward the pillar 112, the sensing module 140 is aligned with the pillar 112, namely, the sensing module 140 is located orthogonally under the pillar 112. Then, the control module 120 drives the print head module 130 to move upward along the Z axis (in a direction toward the positive X axis), such that the probe 143 of the sensing module 140 is driven to protrude from the print head module 130 and presents a floating state, as illustrated in FIG. 2A and FIG. 2B. In this circumstance, a length for the probe 143 protruding from the print head module 130 is greater than a length of a print head 132 of the print head module 130. Thus, the control module 120 in this condition may further drive the print head module 130 to move along the X-Y plane and cause the probe 143 to contact the platform 150. Thereby, during the process of moving, the probe 143 may contact and show the planarity or the surficial outline of the platform 150, such that the sensing unit 144 may sense data related to the planarity or the surficial outline and return the data to the control module 120. Thereby, the processing module or the user of the 3-D printing apparatus 100 may obtain a surface state of the platform 150 for performing the corresponding operation.

Figure 4A:
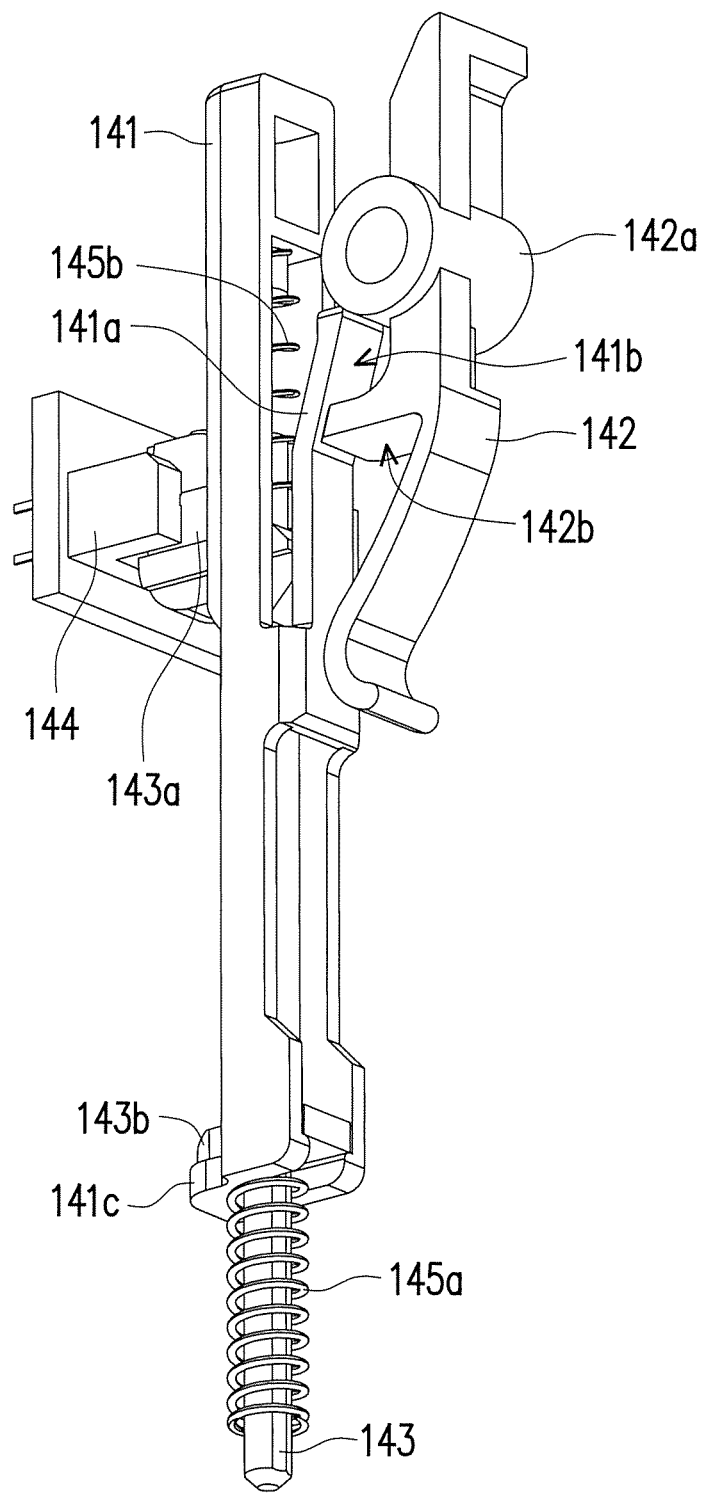
FIG. 4A is a schematic diagram illustrating the sensing module.
Figure 4B:
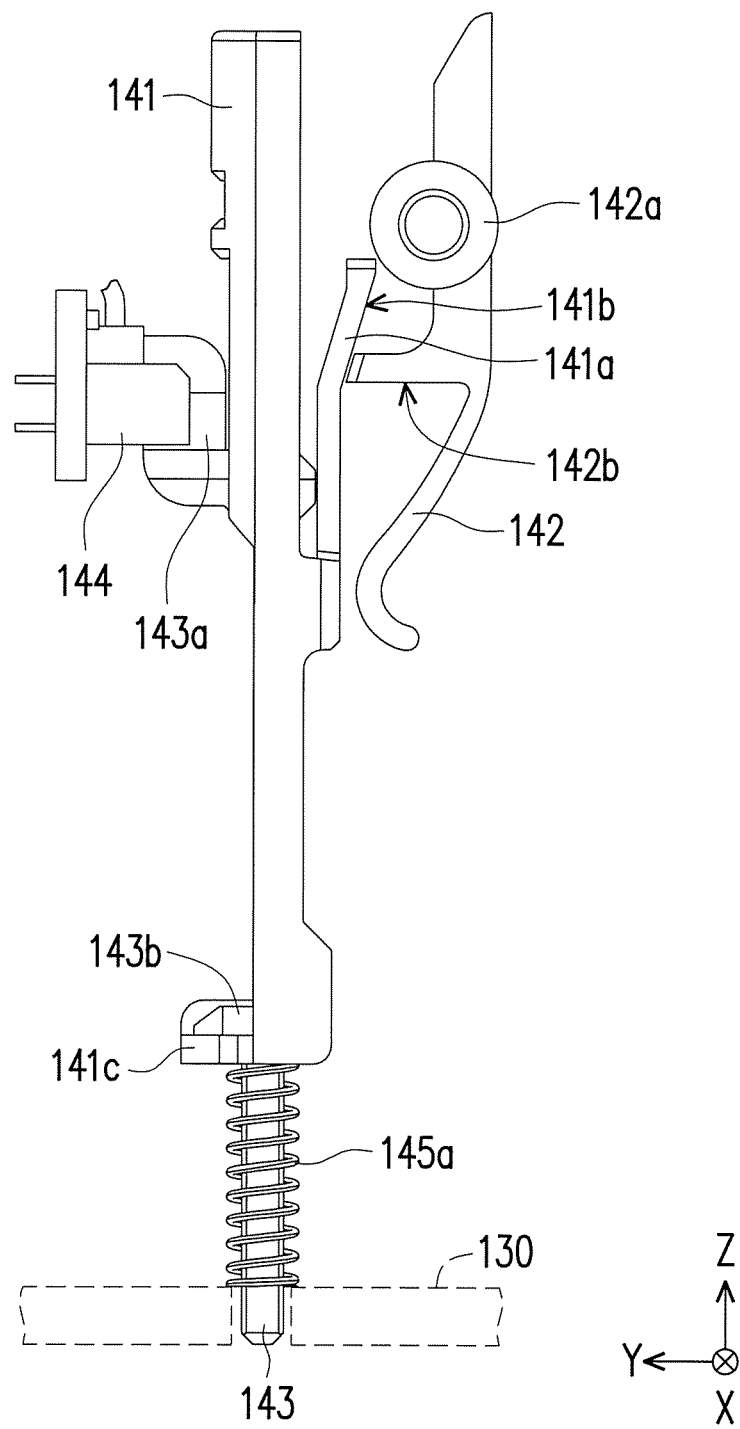
FIG. 4B is a side-view diagram illustrating the sensing module depicted in FIG. 4A.

FIG. 4A is a schematic diagram illustrating the sensing module. FIG. 4B is a side-view diagram illustrating the sensing module depicted in FIG. 4A. Referring to FIG. 3, FIG. 4A and FIG. 4B simultaneously, in the present embodiment, the sensing module 140 includes a pressing member 141, a toggle member 142, the sensing unit 144, a first elastic member 145a, a second elastic member 145b and the probe 143. In this case, the print head module 130 is substantially formed by structures A1 and A2. The pressing member 141 is movably assembled into the structure A2 along the Z axis, the probe 143 is also movably assembled into the pressing member 141 along the Z axis, and the toggle member 142 is pivoted between the structures A1 and A2 to pivot about the X axis. As illustrated in FIG. 4A, the second elastic member 145b contacts between the pressing member 141 and the probe 143. As illustrated in FIG. 4B, the first elastic member 145a contacts between the pressing member 141 and the print head module 130 (substantially the structure A1). In this way, when the sensing module 140 is aligned with the pillar 112 in the way as described above, it represents that the pressing member 141 of the sensing module 140 is located orthogonally under the pillar 112. Thus, the pressing member 141, which is hit by the pillar 112, moves in a direction toward the negative Z axis, such that the probe 143 protrudes from the bottom of the print head module 130 to form a first state, referring to the state changes shown by arrows in FIG. 2A and FIG. 2B, which indicates that the probe 143 of the sensing module 140 is switched from a second state (where the probe 143 is retracted back to the print head module 130) to the first state (where the probe 143 protrudes from the bottom of the print head module 130. In other words, when the pressing member 141 moves downward, the probe 143 also protrudes from the bottom of the print head module 130 as the pressing member 141 moves downward.

Figure 4C:
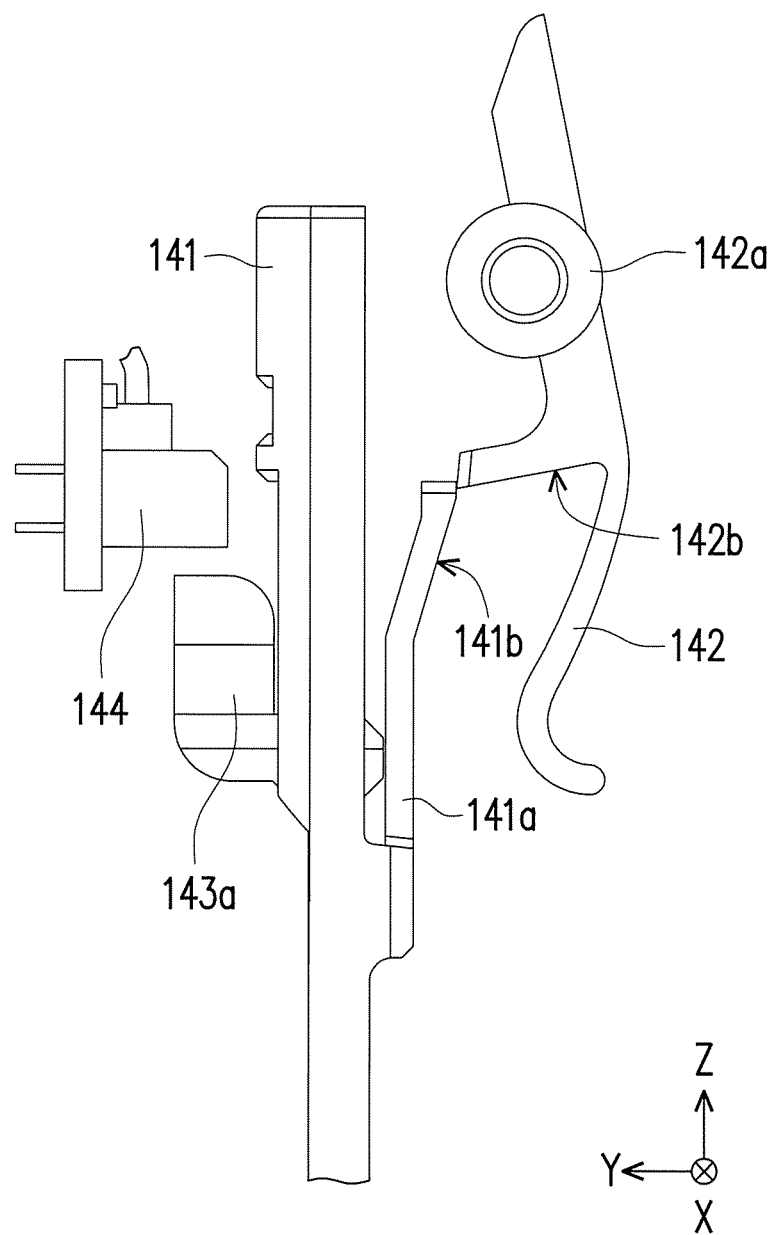
FIG. 4C is a side-view diagram illustrating a part of the sensing module depicted in FIG. 4A in another state.
Figure 4D:
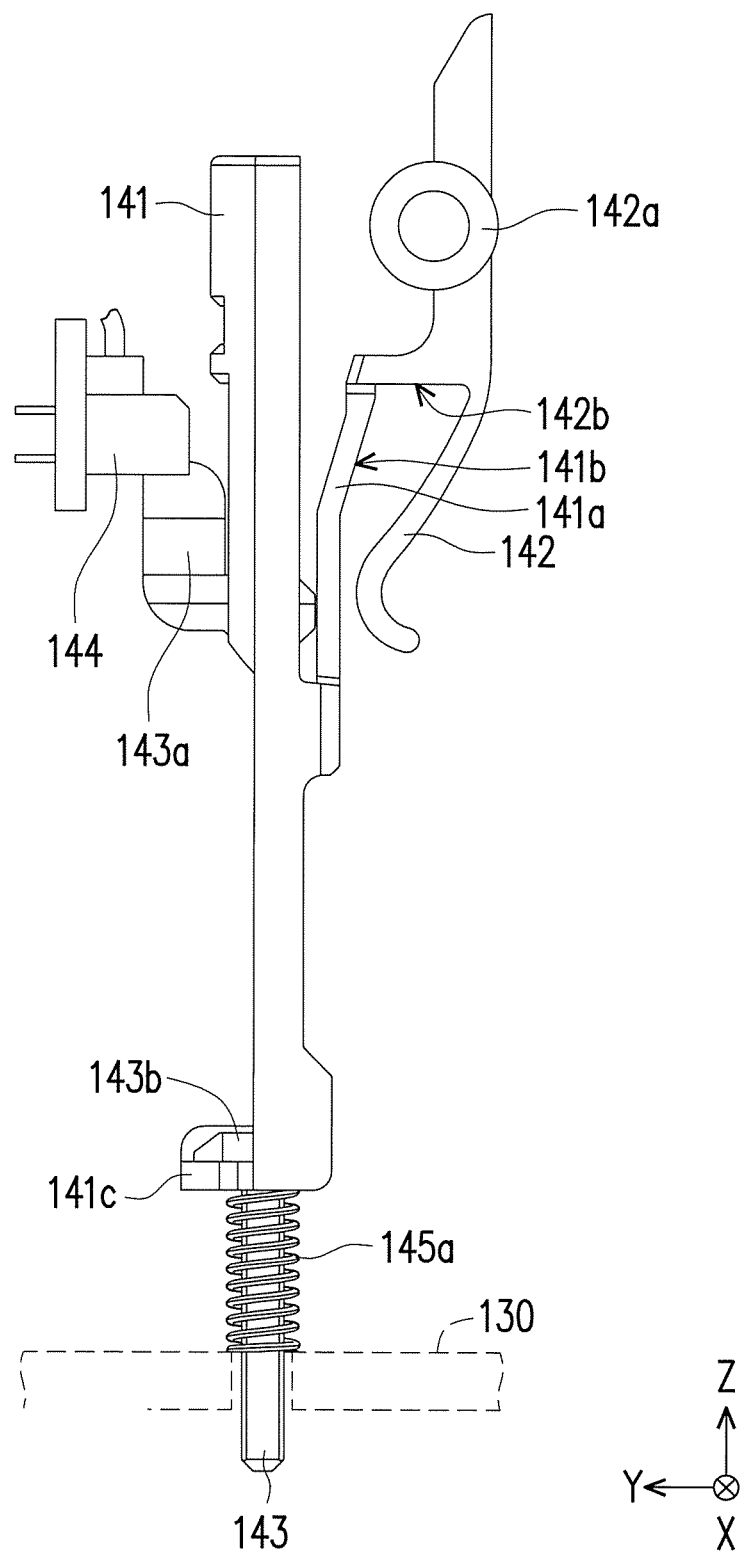
FIG. 4D is a side-view diagram illustrating a part of the sensing module depicted in FIG. 4A in another state.

FIG. 4C is a side-view diagram illustrating a part of the sensing module depicted in FIG. 4A in another state. FIG. 4D is a side-view diagram illustrating a part of the sensing module depicted in FIG. 4A in another state. Referring to FIG. 4B to FIG. 4D simultaneously, in the present embodiment, the pressing member 141 has an elastic cantilever 141a extending toward the toggle member 142, the toggle member 142, in addition to being pivoted to a pivot portion 142a of the print head module 130, has a first stopping portion 142b located on a moving path of the elastic cantilever 141a. Furthermore, the elastic cantilever 141a has an inclined surface 141b. During the process of the elastic cantilever 141a turning the toggle member 142, the first stopping portion 142b moves along the inclined surface 141b to pivot the toggle member 142, and thereby, the first stopping portion 142b gradually moves away from the moving path of the elastic cantilever 141a. As illustrated in FIG. 4C, the toggle member 142 in this case rotates counterclockwise to move away from the pressing member 141. Then, referring to both FIG. 4C and FIG. 4D, the first stopping portion 142b is located at a structural gravity center side of the toggle member 142, and after the first stopping portion 142b moves away from the moving path of the elastic cantilever 141a (which is considered as rotating counterclockwise) by the elastic cantilever 141a turning the toggle member 142, the toggle member 142 is pivoted (which is considered as rotating clockwise) with the structural gravity center, such that the first stopping portion 142b moves back to the moving path of the elastic cantilever 141a. At this time, the pressing member 141 moves to the position as illustrated in FIG. 4D, and thus, the first stopping portion 142b is substantially located above the elastic cantilever 141a. Moreover, the pressing member 141 is hit by the pillar 112 and pressed down, which causes the first elastic member 145a to be deformed and pressed. Thus, when the pressing member 141 is no longer presses down by the pillar 112, the pressing member 141 is driven to return back and move upward by an elastic returning force of the first elastic member 145a. At this time, the first stopping portion 142b is located on the returning path of the elastic cantilever 141a, the first stopping portion 142b of the toggle member 142 and the elastic cantilever 141a of the pressing member 141 are interfered with each other, thereby keeping the sensing module 140 in the first state.

Additionally, the probe 143 is still in the movably floating state along the Z axis while the pressing member 141 and the toggle member 142 are interfered with each other. In additionally, the probe 143 is prevented from falling out of the print head module 130 due to moving in a direction toward the Z axis merely by a convexity 141c of the pressing member 141 and a second spotting portion 143b of the probe 143 being interfered with each other at the Z axis. Substantially, the probe 143 is on the protrusion 141c to be in the floating state merely by the second elastic member 145b contacting between the probe 143 and the pressing member 141. Namely, the probe 143, when contacting the platform 150, may move along the Z axis due to the change of the surficial outline of the platform 150. In other words, the pressing member 141 drives the probe 143 to move to protrude from the bottom of the print head module 130 to form the first state through the second elastic member 145b, and at this time, the probe 143 is in the floating state relative to the pressing member 141 through the second elastic member 145b.

The sensing module 140 further includes the sensing unit 144 electrically connected with the control module 120, and the probe 143 further has a shutter portion 143a for turning on or off the sensing unit 144 in the floating state. Referring to FIG. 4D, the sensing unit 144 is, for example, an optical sensor and thus, capable of moving vertically along the Z axis during the process of the probe 143 contacting the platform 150, such that the shutter portion 143a shutters or does not shutter sensing light of the sensing unit 144. In this way, according to the operation that the sensing light is shuttered or not, the control module 120 may determine the surface state of the platform 150. The surface state herein includes the planarity, the surficial outline, roughness or the like of the platform 150.

Then, after the sensing module 140 completes the sensing operation of the surface state of the platform 150, the control module 120 drives the print head module 130 to again move toward the pillar 112 and causes the toggle member 142 to be hit by the pillar 112 on a side opposite to the first stopping portion 142b, such that the toggle member 142 is driven to pivotally turn counterclockwise to release the first stopping portion 142b from the interference with the elastic cantilever 141a. In this way, the pressing member 141 is driven by the elastic returning force of the first elastic member 145a to return back to the second state illustrated in FIG. 4A and FIG. 4B. So far, the operation of sensing the surface state of the platform 150 is completed by the 3-D printing apparatus 100.

Figure 5A:
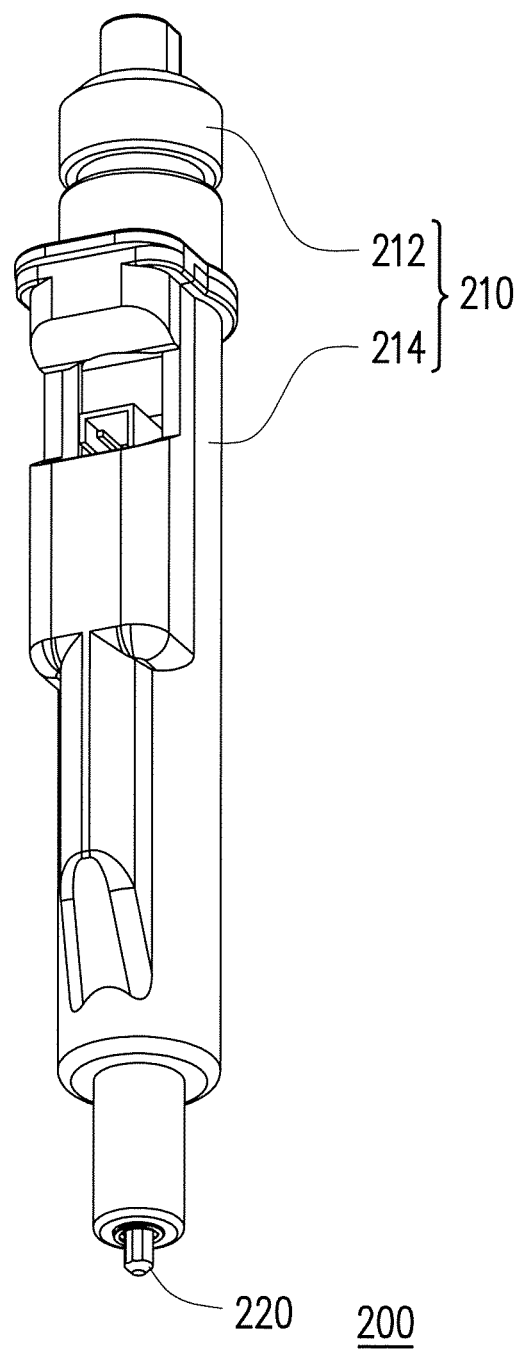
FIG. 5A is a schematic diagram illustrating a sensing module according to another embodiment of the disclosure.
Figure 5B:
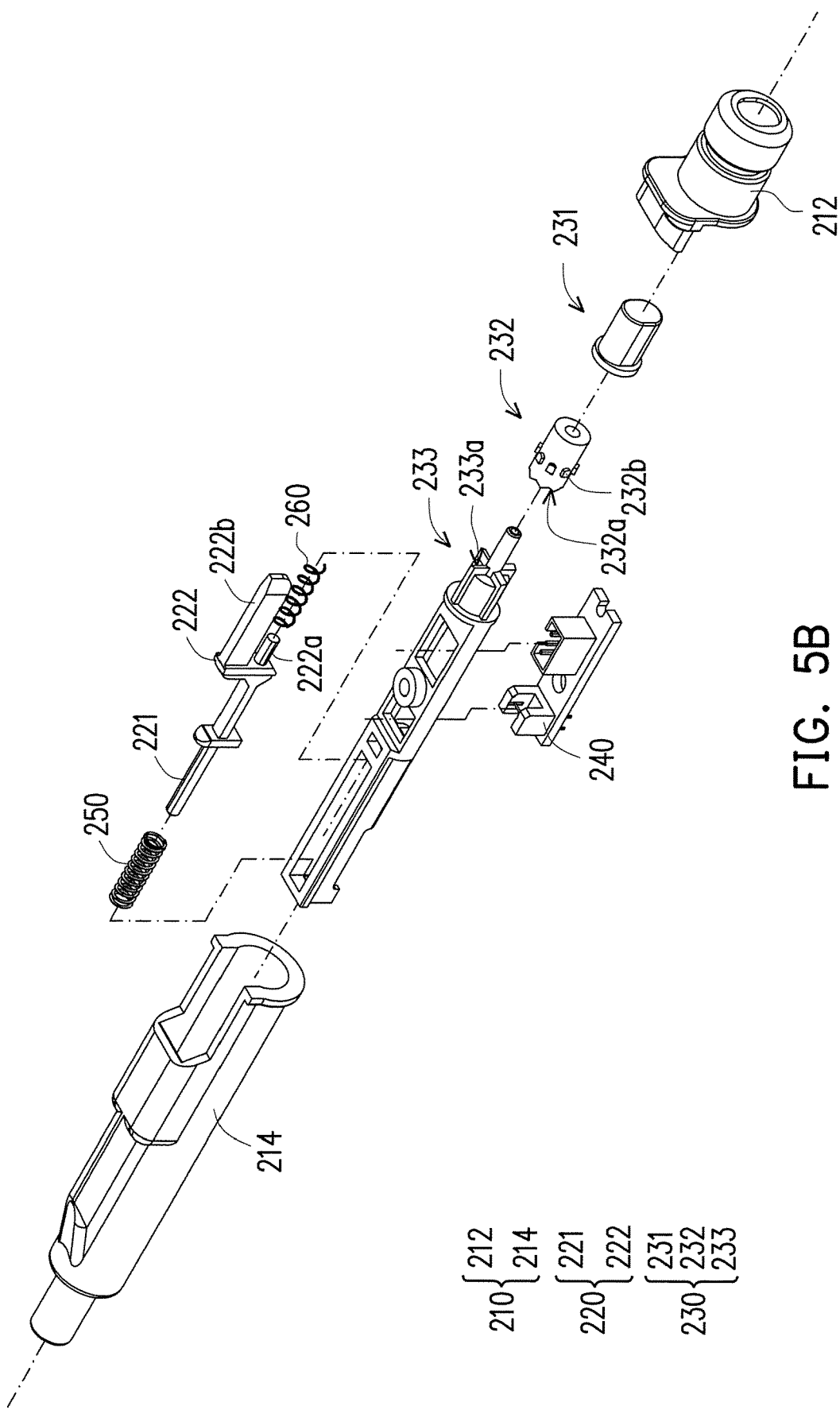
FIG. 5B is an exploded diagram illustrating the sensing module.

FIG. 5A is a schematic diagram illustrating a sensing module according to another embodiment of the disclosure. FIG. 5B is an exploded diagram illustrating the sensing module. Referring to both FIG. 5A and FIG. 5B, in the present embodiment, the sensing module may also be disposed on the print head module 130 in the same way to simultaneously move along therewith. Being different from that of the above-described embodiment, the sensing module of the present embodiment includes a housing 210, a probe 220 and a pressing member 230. The housing 210 is assembled to the print head module 130 and includes a first portion 212 and a second portion 214. In another embodiment that is not shown, the housing 210 and the print head module 130 may also be an integral structure.

The pressing member 230 includes a first section 231, a second section 232 and a third section 233. The second section 232 is rotatably adjacent between the first section 231 and the third section 233 around an axial direction (as illustrated in FIG. 5B). The probe 220 is movably sleeved in the third section 233 along the axial direction. In a manner similar to the above-described embodiment, the first elastic member 250 contacts between the third section 233 of the pressing member 230 and the second portion 214 of the housing 210. The probe 220 includes a third portion 221 and a fourth portion 222. The third portion 221 is sleeved in the first elastic member 250. The second elastic member 260 is sleeved on a convex shaft 222a of the fourth portion 222 and contacts between the fourth portion 222 and the third section 233 of the pressing member 230. In the present embodiment, an effect achieved by the first elastic member 250 and the second elastic member 260 is the same as that in the above-described embodiment and thus, will not repeated.

In a manner similar to the above-described embodiment, the first section 231 of the pressing member 230 is adaptive to be pressed by a force (for example, hit by the pillar 112 as described above) to drive the second section 232 and the third section 233 to move, such that the third portion 221 of the probe 220 may protrude from the second portion 214 of the housing 210 and is kept in the floating state (as described above, the probe 143 protrudes from the bottom of the print head module 130 and is kept in the floating state). Thereby, a shutter portion 222b at the fourth portion 222 may correspond to a sensing unit 240 (in the same way as the optical sensor corresponding to the shutter portion) to sense the surface state of the platform 150 by shuttering or not shuttering the sensing light.

Figure 6A:
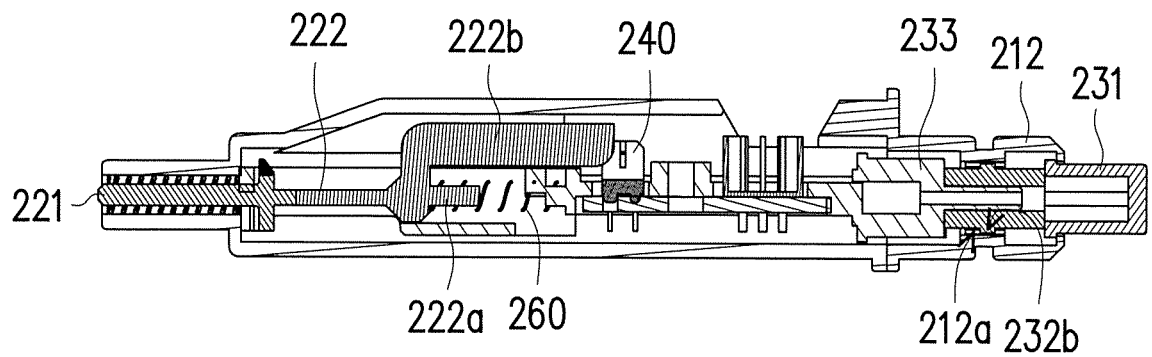
FIG. 6A and FIG. 6B are respectively cross-sectional diagrams illustrating the sensing module.
Figure 6B:
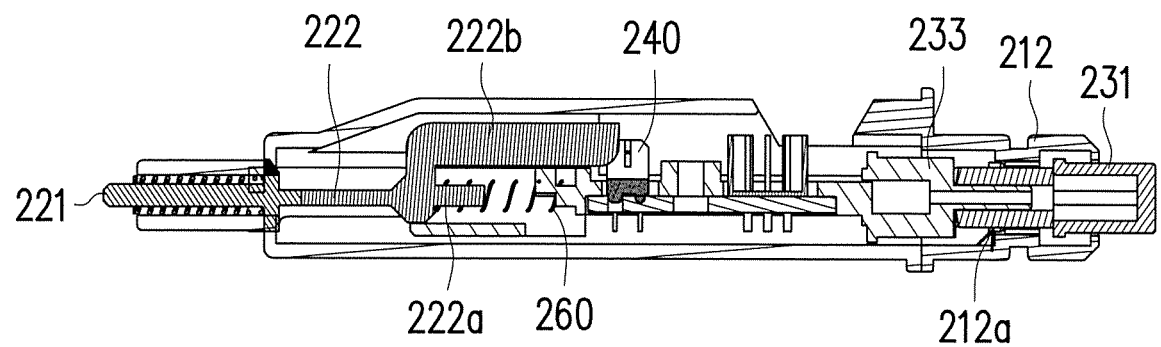
Figure 6C:
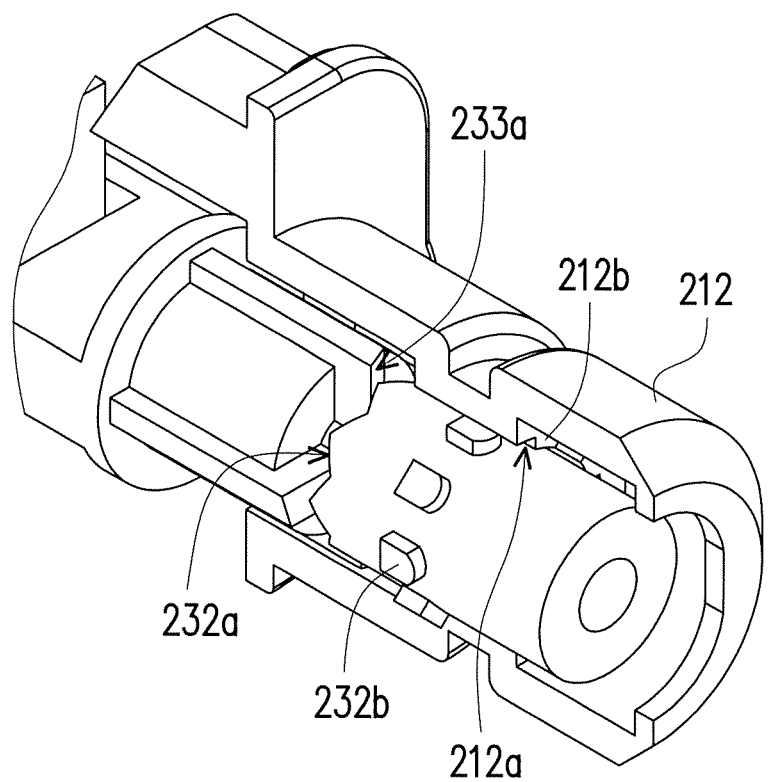
FIG. 6C is a partially cross-sectional diagram illustrating the sensing module.
Figure 6D:
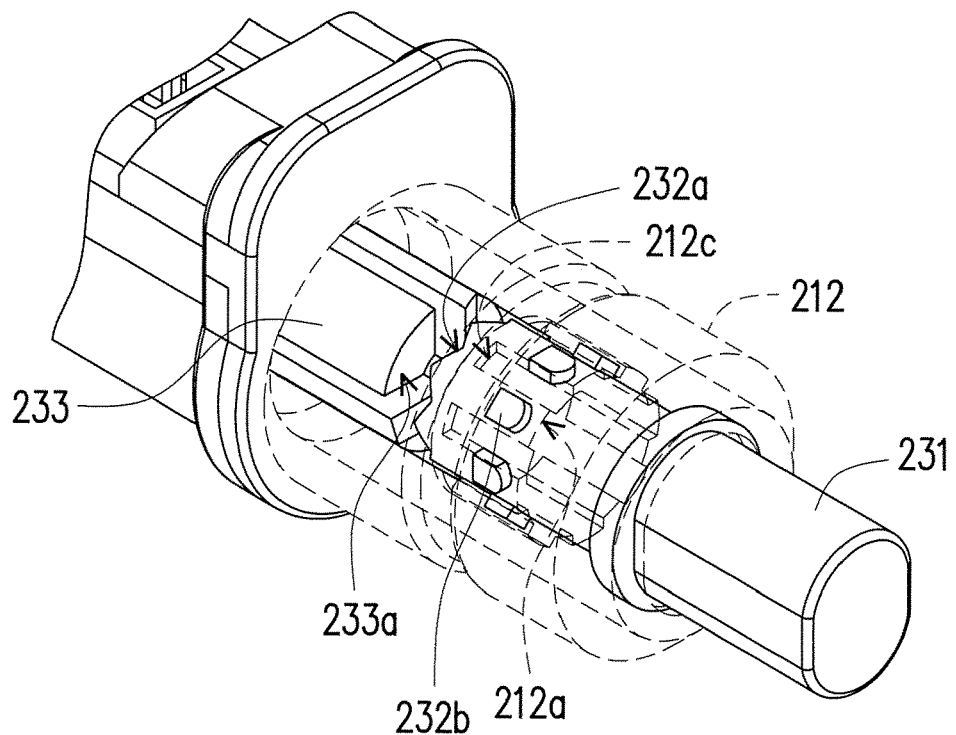
FIG. 6D and FIG. 6E are respectively partially enlarged diagrams illustrating the sensing module.
Figure 6E:
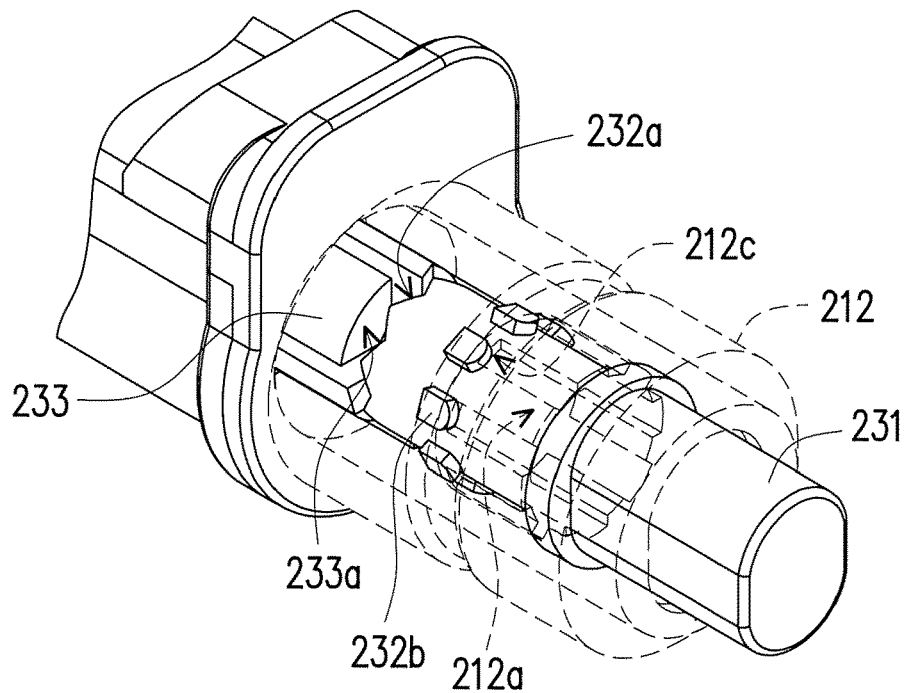

FIG. 6A and FIG. 6B are respectively cross-sectional diagrams illustrating the sensing module. FIG. 6C is a partially cross-sectional diagram illustrating the sensing module. FIG. 6D and FIG. 6E are respectively partially enlarged diagrams illustrating the sensing module. Referring to FIG. 6A to FIG. 6E simultaneously and corresponding to FIG. 5B, it is to mentioned herein that the second section 232 of the pressing member 230 has a ratchet structure 232a, the third section 233 also has a ratchet structure 233a corresponding to the ratchet structure 232a, the second section 232 is substantially pivoted to the third section 233 and thus, with a force applied around the axial direction and the presence of the corresponding ratchet structures 232a and 233a, the second section 232 and the third section 233 presents a state of pivoting relatively to each other about the axial direction.

Furthermore, according to FIG. 6C, the first portion 212 of the housing 210 has a track 212a extending along the axial direction, and the second section 232 has a guide block 232b capable of correspondingly and slidably coupled to the track 212a. When the first section 231 of the pressing member 230 is pressed by a force (for example, hit by the pillar 112 as described above). As illustrated in FIG. 6B, in the process of the second state being switched to the first state, the first section 231 may push the second section 232 to move toward the third section 233, such that the ratchet structures 232a and 233a contact with each other while at this time, the guide block 232b still moves in the track 212a and is limited thereby. Thus, the second section 232 and the third section 233 do not pivot relatively to each other about the axial direction, as illustrated in FIG. 6D.

As illustrated in FIG. 6D, the guide block 232b, after moving out of the track 212a, is no longer limited by a rib 212b at two sides forming the track 212a. Thus, the second section 232 pivots relatively to the third section 233 about the axial direction. The first elastic member 250, during the process of being pressed, is pressed and deformed by the pressing member 230 and thus, after the pressing force is released, the third section 233 is driven to return back by the elastic returning force of the first elastic member 250 (and certainly, the second section 232 and the first section 231 are pushed, indirectly). However, as the guide block 232b already moves away from the track 212a at this time, and the guide block 232b substantially corresponds to a front edge 212c of the guiding rib 212b due to the pivoting of the second section 232, the guide block 232b driven by the elastic returning force contacts and interferes with a front edge of the track 212a (i.e., the front edge 212c of the rib 212b), such that the sensing module is kept in the first state, and the control module 120 accordingly drives the sensing module for the measurement of the surface state of the platform.

It should be mentioned that when the housing 210 and the print head module 130 are considered as an integral structure, the housing 210 substantially may be considered as the structure A2 of the print head module 130 with no hindrance.

Then, after the measurement is completed, in the same manner as described above, the control module 120 drives the print head module 130 to again move toward a part of the body 110 (i.e., the pillar) and causes the first section 231 of the pressing member 230 to again hit the part to again press the first section 231. In this circumstance, the second section 232 and the third section 233 are indirectly pushed. As an influence resulted correspondingly from the ratchet structures 232a and 233a, the second section 232 again pivots relatively to the third section 233 about the axial direction. In this way, the interference between the guide block 232b and the front edge 212c of the rib 212b may be released, and the guide block 232b, along with the pivoting of the second section 232, may again correspond to the track 212a. Thus, when the third section 233 is again driven by the elastic returning force of the first elastic member 250 to push the second section 232, the guide block 232b may successfully move into and move along the track 212a to achieve the position-returning effect.

Based on the above embodiments, in the 3-D printing apparatus, the sensing module is assembled to the print head module and thereby, the sensing module simultaneously moves along the print head module, such that the control module can drive the sensing module to sense the surface state of the platform while controlling the print head module to perform the 3-D printing operation. Accordingly, the surface state of the platform can be obtained before the 3-D printing operation is performed, which is in favor of calibration in advance or compensation during the printing operation.

As the control module drives the print head module to move to cause the pressing member of the sensing module to hit the part of the body, the probe of the sensing module can accordingly protrude from the bottom of the print head module to form the first state, which can contribute to sensing the surface state of the platform. Once the sensing operation is completed, the control module again drives the pressing member to hit the part, such that the probe is retracted back to the print head module to form the second state. Thereby, the time spent on manual sensing can be effectively saved, and in the meantime, the probe can be prevented from being hit and damaged during the 3-D printing operation due to failing to be retracted back in the manual sensing operation.

As the hitting operation varies, the sensing module can employ the toggle member as the pressing member and can be used together with the guide block and the track through the ratchet structures of the pressing member, so as to effectively provide the interference effect when the probe protrudes from the print head module, which can contribute to keeping the probe in the protruding state.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:
1. A three-dimensional (3-D) printing apparatus, comprising:
   a body;
   a platform, disposed in the body;
   a control module;
   a print head module, assembled to the body, electrically connected with the control module and controlled by the control module to move in the body and form a 3-D object on the platform; and
   a sensing module, assembled to the print head module to move along with the print head module in the body, electrically connected with the control module and comprising a probe and a pressing member movably assembled to the print head module along an axial direction that refers to a long axis of the probe, wherein
   the probe is movably sleeved in the pressing member along the axial direction and moves along the pressing member,
   the control module drives the print head module to move and causes a part of the body to hit the pressing member along the axial direction, thereby driving the probe to protrude from the print head module to form a first state, and
   in the first state, the control module drives the print head module to move and causes the probe to contact the platform, thereby determining a surface state of the platform.

2. The 3-D printing apparatus according to claim 1, wherein
the sensing module hits the part of the body along the axial direction to cause the probe to protrude from the print head module along the axial direction, and
in the first state, the probe is in a retractable state along the axial direction.

3. The 3-D printing apparatus according to claim 1, wherein
the sensing module further comprises a first elastic member contacting between the print head module and the pressing member, and
the first elastic member constantly drives the probe to retract back to the print head module from the first state to form a second state.

4. The 3-D printing apparatus according to claim 3, wherein
the sensing module further comprises a toggle member pivoted to the print head module, and
in the first state, the toggle member and the pressing member are interfered interfere with each other to keep the first state.

5. The 3-D printing apparatus according to claim 4, wherein
the toggle member has a first stopping portion extending toward the pressing member,
the pressing member has an elastic cantilever extending toward the toggle member,
the first stopping portion is located on a moving path of the elastic cantilever,
during the process of the first state being formed, the elastic cantilever moves to toggle the first stopping portion to pivot the toggle member, and
the pressing member deforms the first elastic member to drive, such that in the first state, the pressing member is driven to move by an elastic returning force of the first elastic member to cause the elastic cantilever to interfere with the first stopping portion.

6. The 3-D printing apparatus according to claim 5, wherein
the elastic cantilever has an inclined surface, and
during the process of the elastic cantilever toggling the toggle member, the first stopping portion moves along the inclined surface to pivot the toggle member, such that the first stopping portion gradually moves away from the moving path of the elastic cantilever.

7. The 3-D printing apparatus according to claim 6, wherein the first stopping portion is located at a structural gravity center side of the toggle member, and
the toggle member pivotally turns with the structural gravity center after the elastic cantilever moves the first stopping portion away from the moving path of the elastic cantilever through the first stopping portion, thereby causing the first stopping portion to move back to the moving path of the elastic cantilever.

8. The 3-D printing apparatus according to claim 5, wherein
in the first state, the control module drives the print head module to move to cause the part of the body to hit and pivot the toggle member, thereby moving the first stopping portion away from the elastic cantilever to release the interference between the toggle member and the pressing member to switch to the second state.

9. The 3-D printing apparatus according to claim 1, wherein
the sensing module further comprises a second elastic member contacting between the pressing member and the probe,
the pressing member drives the probe to move to protrude from the print head module through the second elastic member to form the first state, and
the probe is in a retractable state relative to the pressing member through the second elastic member.

10. The 3-D printing apparatus according to claim 2, wherein
the sensing module further comprises a sensing unit electrically connected with the control module, and
the probe further has a shutter portion for turning on or turning off the sensing unit in the retractable state.

11. The 3-D printing apparatus according to claim 3, wherein
the pressing member has a first section, a second section and a third section, wherein the second section is rotatably adjacent between the first section and the third section around the axial direction,
the probe is movably sleeved in the third section along the axial direction, and
the body hits the first section along the axial direction to drive the second section and the third section to move.

12. The 3-D printing apparatus according to claim 11, the second section and the third section respectively have ratchet structures to contact with each other to mutually rotate about the axial direction when the second section and the third section are pushed along the axial direction.

13. The 3-D printing apparatus according to claim 12, wherein
the print head module has at least one track extending along the axial direction,
the second section has at least one guide block slidably coupled to the track, such that during the process of the second state being switched to the first state, the guide block moves with the second section along the track without rotating until the guide block moves out of the track, and
when the guide block moves out of the track, the ratchet structures cause the second section to rotate relatively to the third section, and the third section is driven to return back by an elastic returning force of the first elastic member, such that the guide block contacts and interferes with a front edge of the track to keep the first state.

14. The 3-D printing apparatus according to claim 13, wherein
during the process of the first state being switched to the second state, the control module drives the print head module to move to cause the part of the body to again hit the first section along the axial direction to sequentially drive the second section and the third section to release the interference between the guide block and the track and cause the second section to rotate relatively to the third section through the ratchet structure, such that the guide block is aligned with the track, and when the third section is driven to return back by the elastic returning force of the first elastic member, the guide block slides along the track.

* * * * *